Sept. 15, 1970   K. C. EMERSON ET AL   3,529,283
AIRCRAFT FLIGHT DIRECTOR INSTRUMENT
Filed Nov. 14, 1967   4 Sheets-Sheet 1

INVENTORS
KENNETH C. EMERSON
SIEGFRIED KNEMEYER
KENNETH G. MARTIN

BY *Richard W Anderson*
AGENT

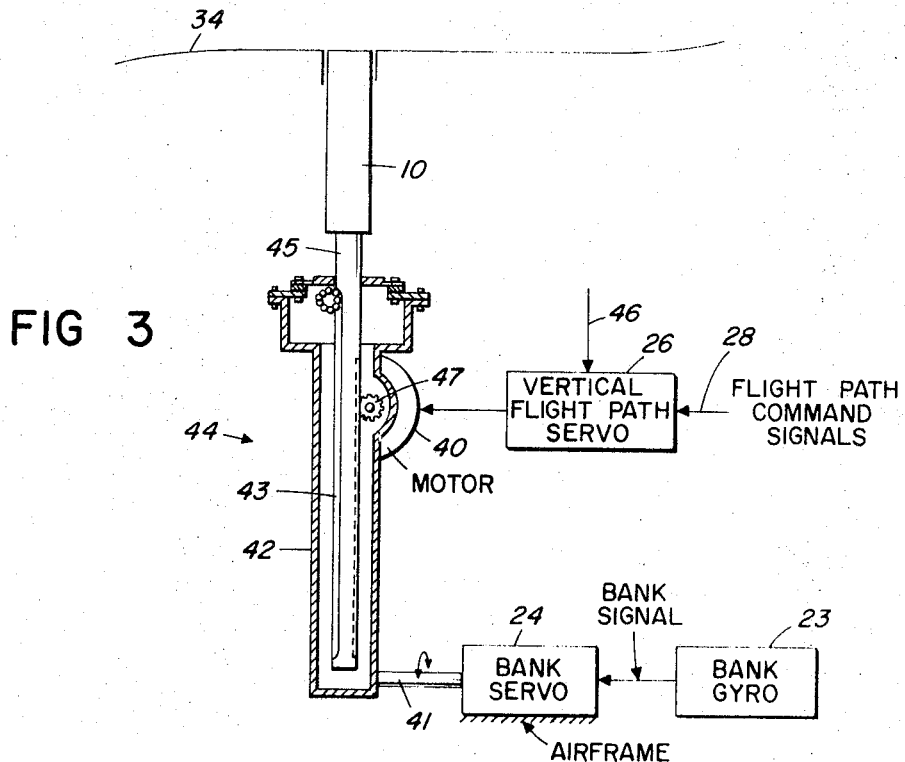
FIG 3
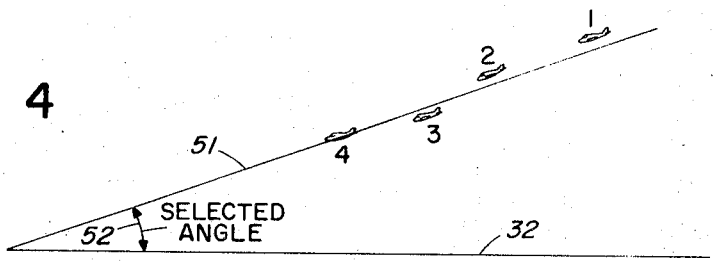
FIG 4
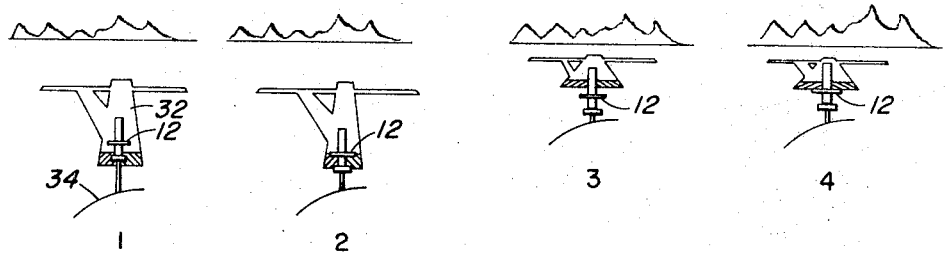
INVENTORS
KENNETH C. EMERSON
SIEGFRIED KNEMEYER
KENNETH G. MARTIN
BY Richard W Anderson
AGENT

United States Patent Office

3,529,283
Patented Sept. 15, 1970

3,529,283
AIRCRAFT FLIGHT DIRECTOR INSTRUMENT
Kenneth C. Emerson and Kenneth G. Martin, Cedar Rapids, Iowa, and Siegfried Knemeyer, Yellow Springs, Ohio, assignors to Collins Radio Company, Cedar Rapids, Iowa, a corporation of Iowa
Filed Nov. 14, 1967, Ser. No. 682,834
Int. Cl. G01c 23/00
U.S. Cl. 340—27          20 Claims

ABSTRACT OF THE DISCLOSURE

A landing aid device for mounting ahead of the aircraft windscreen in the line of sight of the pilot which may be used for visual flight rule, landing approaches or instrument flight rule landing approaches, combining the requirements and advantages of both types of instruments. The instrument basically combines a dynamic steering indication readily observable and instinctively interpretable without direct obeservation by the observer with an observable speed control indication and common reference index which doubles as a sighting index with respect to a ground aimpoint.

---

This invention relates generally to aircraft flight control and more particularly to a flight director instrument providing aircraft steering guidance and throttle control during the approach phases of a landing.

Numerous expedients have been designed into aircraft instruments to aid the pilot in landing his aircraft under conditions of low visibility. More recently in the instrumentation art, the problem of terminal guidance in landing maneuver has given rise to more sophisticated computing systems which enable the pilot to bring his aircraft through the approach, flare-out, and touchdown phases of a landing under control of instrumentation. The current instrument landing philosophy is to enable the pilot to guide his aircraft down to some minimum altitude beyond which he would guide the aircraft visually to touchdown, assuming he has broken through the condition of bad visibility by the time the predetermined minimum altitude is reached. The final phase of the landing problem is then conducted on a visual flight rule (VFR) basis while the initial phase of the landing is made under instrument flight rule (IFR) conditions.

The shortcomings of using visual control during the terminal phase of a landing have however presented additional problems. There are many types of weather conditions that obscure contact with a runway after it has been established. Further, aside from the problem of the maintenance of visual reference during the terminal phases of a landing, high accident rates have been encountered during visual approaches and landings in clear weather due to the complexity of the relationship between aircraft angle of attack requirements, throttle settings, and the general physical orientation the pilot must effect as concerns craft attitude, etc.

Most recently in the instrumentation art, development efforts have begun, in recognition of the problem the pilot has during the transition from instrument control to visual control, towards the provisions of "heads up" landing aids. The advantages of the "heads up" display is well known in that it provides the steering and attitude indications necessary to effect an instrument landing as an optical projection or some other form of presentation which enables the pilot to maintain his line of sight vigil through the aircraft windscreen while still being provided with instrument guidance. A further family of instrumentation which recognizes the value of "heads up" type of display is in the form of dynamic steering command display which may be viewed peripherally and, while not located directly in the line of sight of a pilot as he looks through his windscreen, may nonetheless be observable through peripheral vision.

The object of the present invention is the provision of a new type of instrument combining the advantages of a "heads up" display with the advantages of the dynamic type of display and which further may be utilized as an aiming or sighting device during conditions of complete visibility.

A further object of the present invention is the provision of a "heads up" type of display of less complexity than the optical projection type of display.

A still further object of the present invention is the provision of a landing aid providing a more natural transition from IFR to VFR flight and usually under conditions of extreme low visibility and for full visual flight by itself.

The present invention is featured in the provision of a flight instrument mounted a predetermined distance ahead of the observer so as to be viewed by the observer in focus along with a distance ground located aim point such as the end of a runway.

A further feature of the present invention is the provision of a visual sighting reference in an aircraft instrument which instrument additionally provides dynamic steering command information readily observable and referenced against the visual sighting reference.

These and other features and objects of the present invention will become apparent when read in conjunction with the accompanying drawings in which:

FIG. 3 is a functional diagram of the manner in which the instrument housing may be regulated with respect to the airframe;

FIG. 4 is a pictorial diagram depicting various flight conditions with respect to a selected vertical flight path in conjunction with the visual sighting function of the instrument;

As above discussed, the present invention relates to a flight director instrument which will permit the pilot to focus on a fixed ground reference and still have his flight information easily available to him without having to focus his eyes inside the cockpit on the instrument panel. The instrument to be described is narrower than the distance between the pilot's eyes so that nothing will be obstructed in the pilot's field of outside visual reference. The flight information to be described is dominately presented so that the pilot may perceive it even when his eyes are focused on the ground visual reference as on the end of a runway. In accordance with the present invention, an instrument is provided which will give the pilot continuous control information easily accessible to him while remaining on visual contact, during the transition to outside or ground reference, and when breaking out from instrument flight.

Figure 1:
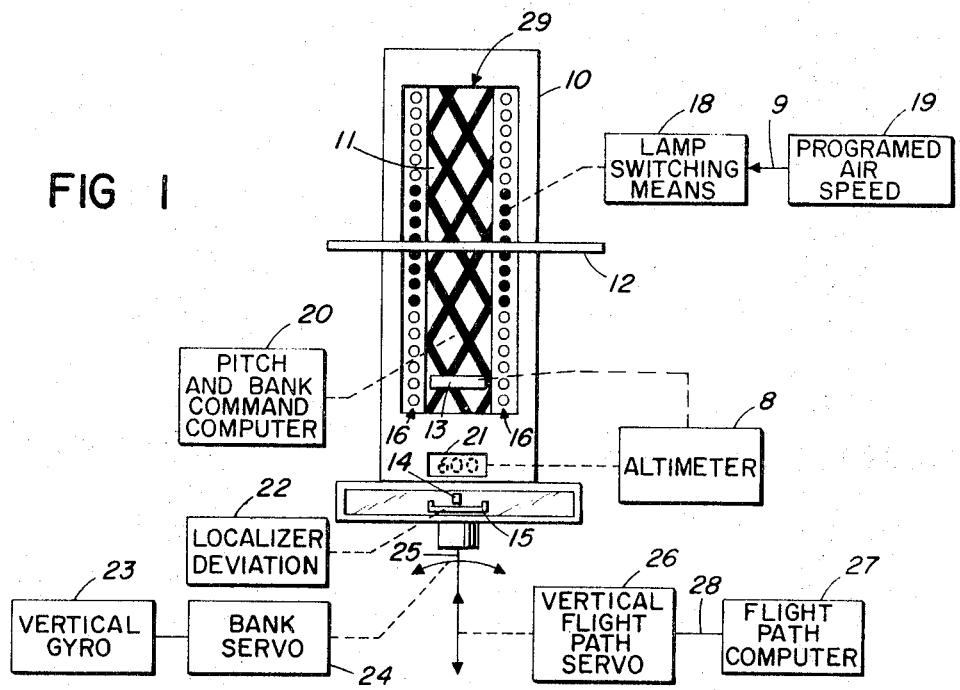
FIG. 1 is a functional diagram of an instrument in accordance with the present invention including representations of the input parameters in response to which the display is motivated.

FIG. 1 illustrates an observer's view of the instrument in conjunction with certain functionally represented control signal sources in response to which the various indicia are motivated. The instrument is comprised of a housing 10 formed with a viewing window 29 through which may be observed a geometric pattern 11. As will be further described, the geometric pattern 11 comprises a viewable portion of a dynamic indicating means which, in response to the application of pitch and bank commands from a computer source 20, moves dynamically in speed and direction as the vector resultant of pitch and bank signals applied to the motivating means driving the pattern. An upward motion of the diamond-like pattern viewed by the observer through the window 29 would indicate a pitch-up command to the pilot. A motion of the pattern in a downward direction would indicate a pitch down command. Similarly, a pattern motion to the left or to the right would indicate respectively bank left and bank right commands. In each instance, the interpretation of the dynamic steering command presented by this type of display is that of steering the aircraft to "catch up" with the motion of the pattern. In the case of composite input signals wherein both pitch and bank are commanded, the motion of the pattern corresponds to the angle of the vector resultant of the particular pitch-bank combination command applied to the motivating means.

On either side of the geometric pattern viewable through window 29 is mounted a further indicating means in the form of a speed command which might comprise a pattern of energized indicating lamps 16 as pictured black in FIG. 1. A like arrangement of indicating lamps may be placed on either side of the pattern 11, with energizing control being duplicated by a common lamp switching means 18 in response to a command signal 9 from some programmed or selected air speed source 19. As will be further described, the lamp switching means might be arranged to light adjacent ones of twenty lamps in a row so as to form a vertically extending lighted "pointer."

A horizontal extending reference index 12 is affixed to the front face of the instrument housing 10 and the ends of the horiznotal reference index 12 may extend beyond the transverse extremes of the instrument housing 10. As pictured in FIG. 1, horizontal reference index 12 transverses the instrument housing 10 approximately midway between the vertical extremes of the geometric pattern viewed through window 29. This horizontal index 12 serves as zero reference for the speed indication or speed command formed by the illuminated group of adjacent lamps. When the illuminated group of lamps is symmetrically arranged with respect to the horizontal index 12, a zero speed command is indicated. As will be further described, the center of the group of eight illuminated lamps will fall above the horizontal index 12 for speeds in excess of a commanded or desired speed, while a pattern of illuminated lights falling beneath the horizontal reference calls for an increase in airspeed to make good a commanded speed. The vertical position of the illuminated pattern of lamps 6 with respect to the horizontal reference 12 thus becomes a speed command.

The instrument may further comprise an altitude indication in the form of a bar member 13 the position of which with respect to the horizontal reference 12 is an indication of aircraft altitude.

FIG. 1 indicates an altimeter source 8 controlling the vertical position of the bar means 13 with respect to the horizontal reference 12.

A further digital readout of altitude may be incorporated by an appropriate counter mechanism 21 located in the bottom portion of the instrument and viewable by the observer.

A still further indication of course deviation or localizer deviation may be incorporated in the low extreme of the instrument in the form of a further bar-like member 15 in conjunction with a fixed reference index 14. As indicated in FIG. 1, the horizontal position of the deviation indicator 15 might be controlled from a localizer course deviation source 22. Since localizer deviation signal is inherently an angular signal, the size of the localizer deviation bar 15 may, in a preferred embodiment, be so chosen as to represent an analogue of runway width and thus the aircraft's lateral position with respect to the runway. Thus the localizer deviation indicator 15 may serve as a back-up display to the bank command information applied from bank command computer 20 to the dynamic steering indicator 11.

FIG. 1 further indicates fuctionally means by which the entire instrument housing per se may be servoed vertically with respect to the airframe by means of a vertical flight path servo 26 receiving a command signal 28 from a flight path computer 27.

The entire instrument housing 10 may additionally be stabilized in bank with respect to the airframe by means of a bank servo 24 in conjunction with a vertical gyro reference 23.

Figure 2:
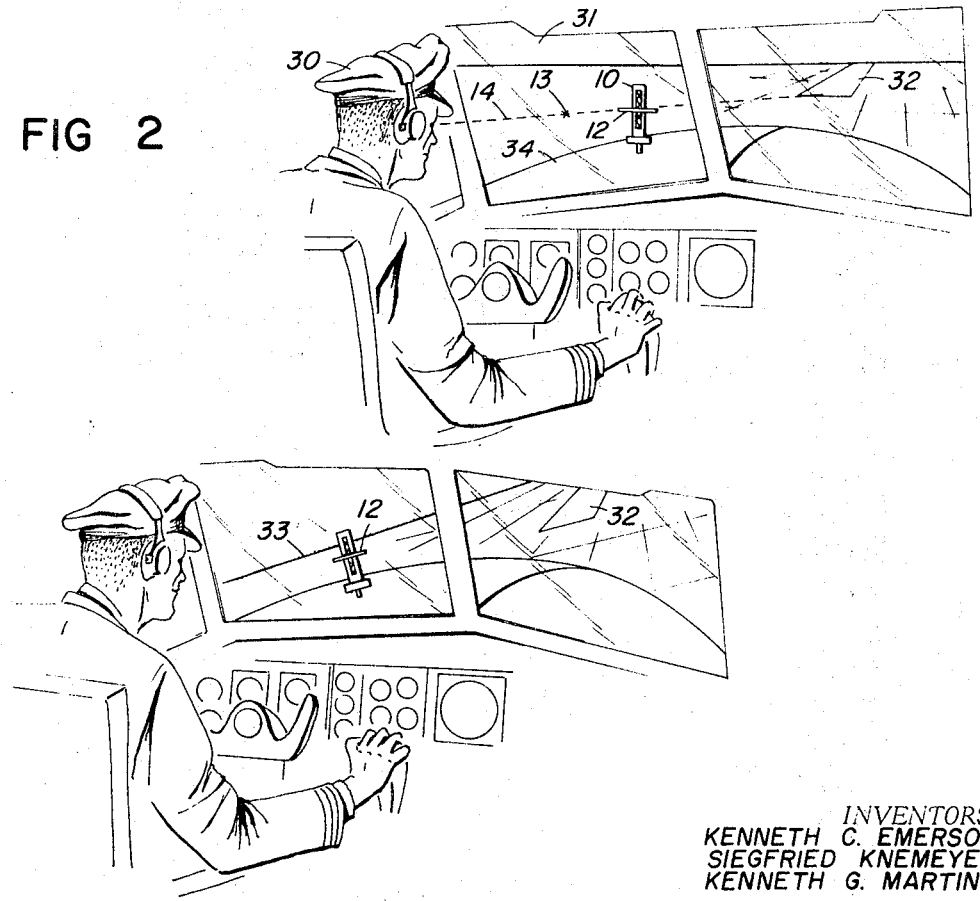
FIG. 2 is a pictorial diagram depicting use of the instrument as a visual aid device in conjunction with a distant aimpoint.

FIG. 2 illustrates the significance of the bank stabilization and vertical flight path servo positions of the instrument housing per se. As previously discussed, the instrument of this invention is mounted forward of the windscreen along the observer's line of sight with respect to an aimpoint. FIG. 2 illustrates that the aimpoint might be the end of a runway 32. The horizontal reference member 12 which extends beyond the transverse extremes of the instrument housing 10 may thus serve as a sighting index for use in visual landing control. FIG. 2 illustrates that the instrument housing may be bank stabilized so that the horizontal reference member 12 or sighting index remains aligned with the horizon to aid in this visual sighting feature. As indicated in FIG. 2 the instrument housing 10 extends upwardly from the aircraft cowl 34 at a point beyond the aircraft windscreen. For any fixed vertical position of the instrument housing 10, and thus the horizontal reference index 12, with respect to the airframe, the touchdown or aimpoint being realized for any particular flight orientation is indicated by the extension of a line from the pilot's eyes through the reference bar 12 on the instrument housing 10. By means of this visual sighting reference, the desired approach (glide) angle may be established by a selected vertical position of the instrument housing 10 with respect to the airframe. Further the vertical position of the instrument housing 10, and thus the sighting index 12, may be servo positioned in accordance with a predetermined program such that the pilot may visually make good a vertical flight profile such as an asymptotic approach and flareout by controlling the aircraft continuously such that the end of the runway 32 lines up with the horizontal sighting reference 12. At the same time, since the instrument per se is mounted ahead of the pilot's eyes, the throttle control commands and steering commands along with altitude and other flight factors are positioned so as to be in focus to the observer. The instrument of the present invention thus provides a unique combination of an instrument which may be used during terminal VFR flight conditions as well as IFR flight conditions while permitting a natural transition from IFR to VFR under extremely low visibility. The dynamic steering indicator along with the speed control and altitude indication provide the pilot a continuous source of command indication as to what direction and how much he should supply control in pitch, roll and throttle. Since the instrument is mounted outside the cockpit the instrument allows the pilot to focus on the visual reference such as the end of the runway while still having most flight information easily available to him without having to focus his eyes inside the cockpit on his instrument panel.

The manner in which the above discussed indications may be implemented including the means by which the instrument per se may be stabilized in bank and servoed in vertical position to implement the visual sighting index feature will now be examined.

FIG. 3 illustrates functionally the instrument housing 10 as it might be positioned when not in use. The vertical extreme of the instrument housing 10 is seen to be substantially flush with the cowl 34 of the aircraft. The instrument housing 10 may be affixed to a post member 45 which is attached to a rack and pinion drive arrangement 44. The drive arrangement might comprise a housing 42 within which is placed rack gear member 43 in threaded engagement with a drive pinion 47. A motor 40 might rotate the pinion 47 so as to cause a longitudinal displacement of the rack gear 43 with respect to the housing 42. The motor 40 would be driven in response to a signal 28 emanating from a vertical flight path computer 27.

The vertical position of the instrument housing 10 is thus controlled by the vertical flight path servo 26 which may incorporate a zero or reference adjustment input 46 by means of which the reference vertical position of the instrument housing 10 may be adjusted. With reference to FIG. 2, this reference or zero vertical position of the instrument would be made in accordance with the particular line of sight of a given pilot. FIG. 2 illustrates a zero referencing index 13 which may be placed on the windscreen of a particular aircraft by means of which a pilot might effect the proper zero or reference vertical position of the instrument housing 10 according to his particular eye level. The particular vertical position of the instrument housing 10 would, by proper positioning of the drive arrangement of FIG. 3, extend the instrument from within the confines of the aircraft nose upwardly to an operating position as shown in FIG. 2.

FIG. 3 illustrates functionally the means by which the instrument housing 10 may be stabilized in bank. The drive arrangement 44, to which the mounting post 45 of the instrument is affixed, may be mounted to a transversely extending mounting shaft 41 the angular position of which is controlled in accordance with a bank servo 24 under the control of a bank signal input from a bank gyro 23. Thus the instrument housing 10 would remain bank stabilized and the horizontal sighting or reference index 12 would remain parallel with the horizon during bank maneuvers of the aircraft to aid in the visual sighting usage of the instrument.

FIG. 4 illustrates diagrammatically the significance of the vertical sighting feature provided by the instrument in making good a vertical descent in accordance with a selected descent angle 52 with respect to a runway 32. The aircraft is shown in position 1 of FIG. 4 substantially above the descent path defined by angle 52. Detail of FIG. 4 shows the view as seen by the pilot under this condition, with the extension of the line from the pilot's eyes through the sighting reference 12 falling at a point beyond the end of the runway 32. The command here is instinctively that of pitch-down so as to align the end of the runway with the horizontal reference 12. Aircraft position 2 in FIG. 4 shows the desired correction being initiated in that the aircraft is closer to the selected descent path but still above. Detail 2 of FIG. 4 illustrates the corresponding arrangement between the home sight reference 12 and the end of the runway by a steering command which still calls for a pitch down maneuver. Aircraft position 3 of FIG. 4 illustrates an overcorrected position where the aircraft is actually beneath the desired descent path 51. Detail 3 of FIG. 4 indicates that the extension of the line of sight from the pilot's eyes through the sighting reference 12 now falls beneath the edge of the runway, thus commanding a pitch-up maneuver. Aircraft position 4 of FIG. 4 illustrates the desired position in response to which, as seen in detail 4, the end of the runway 32, is lined up with the sighting reference 12 as observed by the pilot.

Figure 5A:
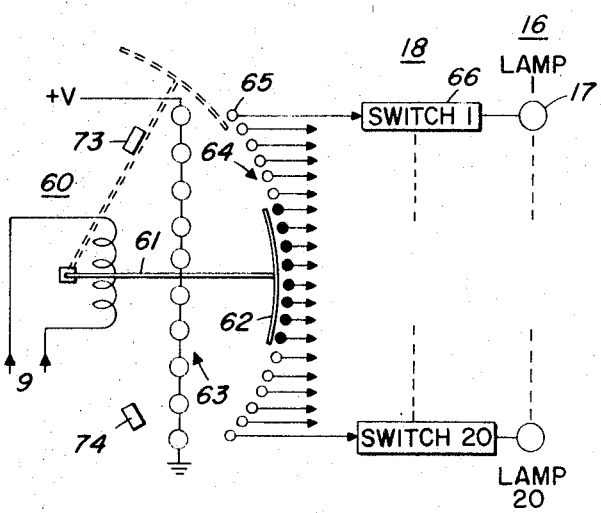
FIGS. 5a and 5b depict schematically an analogue to digtial converter employed in a lamp lighting speed control indicator as employed in the present invention.
Figure 5B:
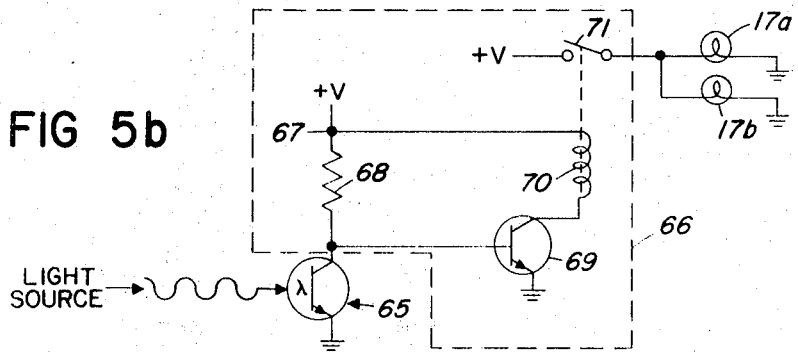

An implementation of the speed control featuring the vertically extending indicating lamp bank 16 is illustrated in FIGS. 5a and 5b. As previously discussed, the speed control would preferably be in the form of an illuminated bar-like indication formed by the lighting of a selected plurality of adjacently disposed indicating lamps on either side of the dynamic steering display. As indicated in FIG. 1, each light bank 16 might be comprised of twenty indicating lamps, horizontally disposed ones of which might be controlled in parallel.

FIG. 5a indicates, in a functional schematic, one such bank 16 of twenty lamps. Each of the lamps 17 in the bank would be energized from an associated switching means 66. The lamp switching control embodied in FIGS. 5a and 5b represents an analogue to digital conversion scheme employing a phototransistor, a light source, and a light masking arrangement to shade certain ones of the transistors from the light source. With reference to FIG. 5a, an input signal 9 in the form of a zero centered DC signal may be applied to a meter movement 60. When the input signal 9 is zero, the meter deflection arm 61 is centered as indicated in FIG. 5a. Meter arm 61 carries a mask member 62 the length of which is sufficient to extend over eight adjacent ones of an arrangement of twenty phototransistors 64. In general function, each of the switching blocks 66 of FIG. 5a is responsive to the input of the associated one of the phototransistors to energize a connected one of the observed lamps. The switching logic is such that for any particular input command 9, the lamps whose switching arrangements are connected to the masked or shaded ones of the phototransistors are energized. Reference is made to FIG. 5b which shows schematically the embodiment of the switching arrangements 66. FIG. 5b indicates a light source impinging on a photo transistor 65. The collector of the phototransistor 65 is connected through a resistor 68 to a positive voltage source 67. The emitter of the phototransistor 65 is grounded. The collector of the phototransistor 65 is connected to the base of a switching transistor 69 the emitter of which is grounded and the collector of which is returned through the energizing winding of a relay to the positive voltage source 67. Thus, when switching transistor 69 is conductive, the relay winding 70 is energized to close the contact 71 and apply an energizing source to lamps 17a and 17b corresponding to the top ones of the lamps in each of the lamp banks 16 in FIG. 1. In operation, phototransistor 65 is energized in response to the light source impinging thereon so as to cut off switching transistor 69 which opens the relay contact 71 to de-energize the lamps 17. Should the mask 62 associated with the meter arm 61 of FIG. 5a fall between the light source and the phototransistor 65, phototransistor 65 is de-energized to turn on switching transistor 69, thus closing relay contact 71 to energize the lamps. Realizing then that each of the twenty phototransistors of FIG. 5a is connected through a switching arrangement 66 in accordance with FIG. 5b and a pair of indicating lamps in the banks 16, it is seen that the control circuitry functions to illuminate eight adjacent ones of the lamps in the banks 16 with the pattern being symmetrically disposed with respect to the horizontal reference index 12 when the speed command is zero as depicted in FIG. 5a; and correspondingly, the pattern of eight adjacently disposed illuminating lamp members would lie respectively above and below the horizontal reference index 12 in response to a "plus" and "minus" speed command inputs 9 as applied to the meter movement 60.

The lamp control circuitry of FIG. 5 lends itself also uniquely to maintaining the extreme pairs of the lamps in the banks 16 energized in the event the input signal 9 is sufficient in magnitude to call for an indication in excess of full scale. The incorporation of mechanical stops 73 and 74 as pictured in FIG. 5a limits the meter indicator arm 61 deflection. Stops 73 and 74 may be oriented such that for a maximum deflection in the upward direction as depicted in FIG. 5a, the mask member 62 still covers the uppermost phototransistor 65 so as to maintain the top lamp 17 of the indicating bank illuminated. Likewise, for an off-scale command in the opposite direction, the other extreme of the mask member 62 lies between the light source and the bottom one of the phototransistors so as to maintain the bottom lamp of the bank illuminated. This feature provides a reference arrangement to assure proper command response in the event the speed command signal 9 would be so excessive so as to, in the absence of a safeguard feature, extinguish all the lamps in the banks. Obviously, without a reference lamp remaining illuminated, the observer would be unable to determine in which "direction" the excessive speed control command had caused the indication to go "off scale."

Figure 6:
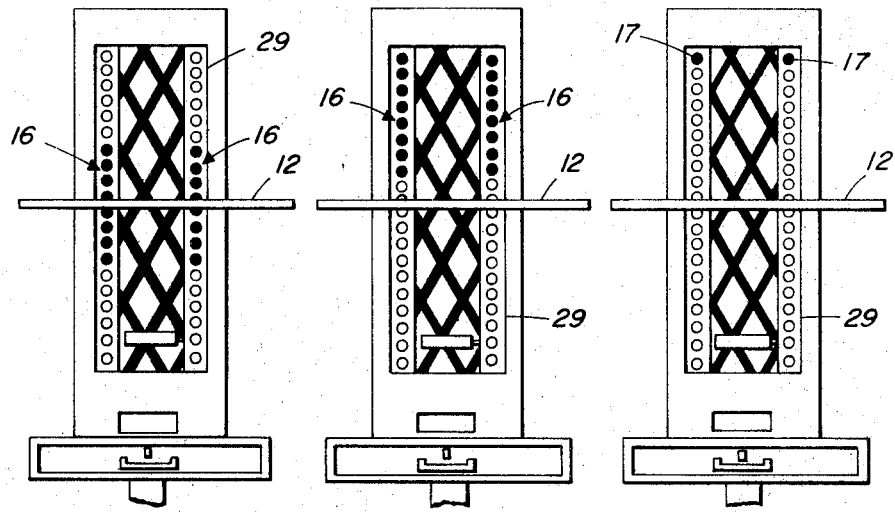
FIG. 6 is a diagrammatic representation of the speed command indications provided by the instrument.

FIG. 6 shows observed speed command indications for conditions of zero command as depicted in FIG. 6a, throttle-back due to excessive speed as depicted in FIG. 6b, and a condition (FIG. 6c) wherein the command is for throttle back and is actually beyond the maximum scale indication. Not pictured in FIG. 6 are similar arrangements wherein the arrangement of illuminated lamps would fall beneath the horizontal reference 12 and command increased speed.

Figure 7:
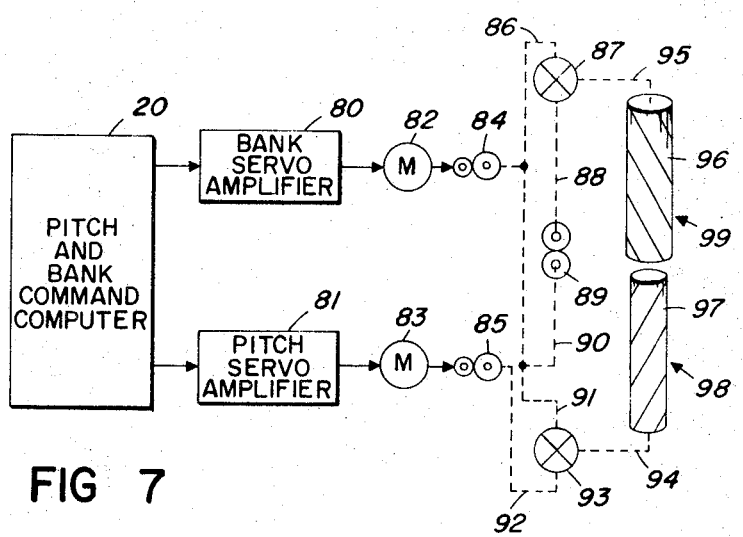
FIG. 7 is a functional diagram of an embodiment of the dynamic steering command display as employed in the instrument.

FIG. 7 illustrates functionally an implementation of the dynamic steering command arrangement in the form of a moving geometric pattern 11 as viewed by the observer. This dynamic display may be embodied by an arrangement of concentrically arranged cylinder members 96 and 98 each of which carries thereon a portion of a helical pattern such that the oppositely inclined diagonally extending lines form a pattern of diamond-like shapes as shown in FIG. 1. Each of the cylinder members 98 and 99 may be controlled in rotation relative to one another from the outputs of differentials 87 and 93. A pitch and bank command computer 20 may supply bank command signals to a first servo amplifier 80 to control a servo motor 82 to provide first inputs to each of differentials 87 and 91 through an appropriate gear ratio 84. A second servo amplifier 81 may accept bank command input signals from computer 20 so as to drive a second motor 85 to develop a second input to each of the differentials 87 and 93. The input to differential 87 from servo motor 83 is imparted with a reverse rotation (by means of gearing arrangement 89) with respect to the second input to differential 93. By means of this arrangement (details and operating characteristics of which are described in detail in Pat. No. 3,176,265 to Horst M. Schweighofer, assigned to the assignee of the present invention) the viewer is presented a dynamic display comprised of a diamond-like pattern the apparent motion of which is in the direction corresponding to the vector resultant of the input pitch and bank command signals and the rate of movement of which is proportional to the magnitude of the command vector.

Figure 8:
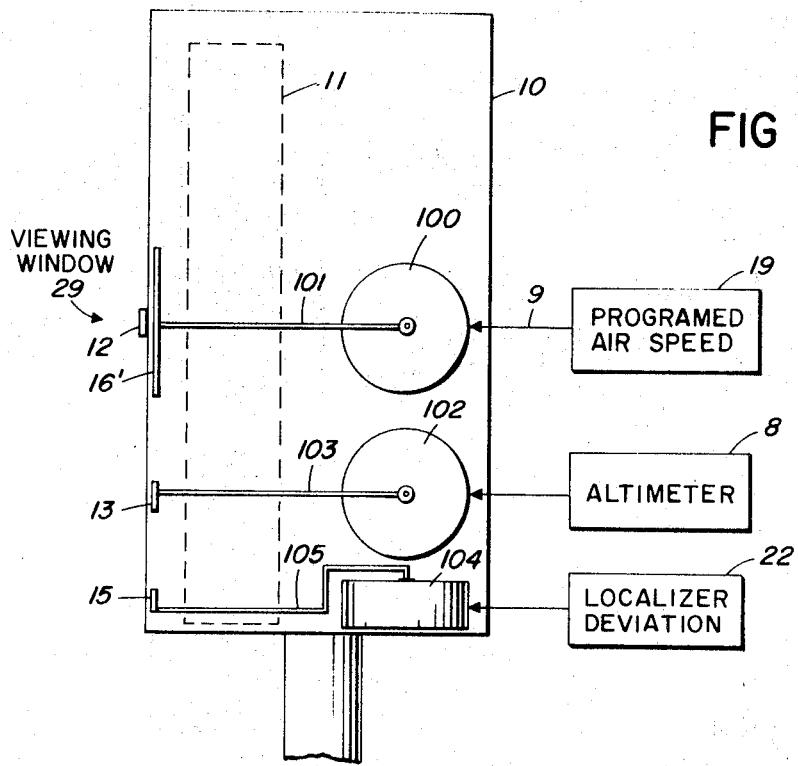
FIG. 8 is a functional diagram of the means for embodying certain additional indicators in the instrument.

FIG. 8 illustrates further implementation schemes by means of which an altitude indicating member 13 may be positioned vertically with respect to the horizontal reference index 12 in response to aircraft altitude. As pictured in FIG. 8, the altitude indication might be embodied by means of a further meter movement 102 receiving the input from an altimeter 8 and deflecting the associated meter arm 103 in response to altitude input signal.

FIG. 8 further shows the implementation of the localizer deviation indicator 15 of FIG. 1 as being a further bar member 15 affixed to a meter arm 105 of a meter movement 104. The arm 105 is deflected in a horizontal plane with respect to the instrument axis in response to input signal from source 22.

Although the speed command presentation of the present invention was described as preferably being an illuminated display caused by the illumination control of adjacent ones of a given number of indicating lamps, FIG. 8 illustrates an alternate embodiment of a speed indicator control in the form of a vertically extending bar member 16' the vertical position of which is controlled by a further meter movement 100 whose arm member 101 is deflected in a vertical plane in response to a speed command signal 9 from the command source 19.

The present invention is thus seen to provide an instrument which dominately presents flight information to a pilot by means of dynamic command and illumination techniques so that the pilot will perceive the command even though he is intently focusing on a ground visual reference. The flight command indication of the present invention thus solves a problem in low visibility landing by giving the pilot continuous control information which is easily accessible to him while remaining in visual contact after transition to outside reference or visual reference when breaking out from instrument flight.

Although the present invention has been described with respect to a particular embodiment thereof, it is not to be so limited, as changes and modifications may be made therein which are within the spirit and scope of the invention as defined by the appended claims.

We claim:

1. An aircraft flight director instrument comprising an instrument housing, means for mounting said instrument housing in front of the wind screen of an aircraft directly in front of an observer and within the observer's normal viewing field, a generally rectangular and vertically extending viewing window located in said instrument housing and in line with the observer's viewing field, first indicating means comprising a viewable portion of a geometric pattern observable through said viewing window, pattern motivating means, means for causing said geometric pattern to continuously move in the horizontal plane of said instrument in a direction and at a rate proportional respectively to the sense and magnitude of an aircraft bank command signal applied to said pattern motivating means, means for causing said geometric pattern to continuously move in the vertical plane of said instrument in a direction and at a rate proportional respectively to the sense and magnitude of an input aircraft pitch command signal applied to said pattern motivating means, said pattern motivating means being adapted to move said geometric pattern in a direction and at a rate respectively proportional to the magnitude and sense of the resultant of the command vector defined by simultaneous pitch and bank command inputs applied to said pattern motivating means, a horizontal reference line index extending transverse the viewing window of said instrument at a point substantially midway between the vertical extremes of said viewing window, a second indicating means comprising a vertically extending indicator of predetermined height mounted adjacent at least one side of said viewing window, motivating means for said second indicating means, said second indicating means being adapted for displacement above and below said horizontal reference index by an amount and in a direction respectively proportional to the magnitude and sense of a third input command signal being applied to the associated motivating means, said third input command signal comprising a speed command signal proportional in magnitude and sense to the discrepancy between the actual speed of said aircraft and a commanded speed of said aircraft.

2. A flight director instrument as defined in claim 1 wherein said second indicating means comprises a vertically extending bar-like indicator of predetermined height adjacent to and on either side of the transverse extremes of said viewing window.

3. An aircraft instrument as defined in claim 2 wherein said second indicating means comprises a vertically extending bank of adjacently mounted indicating lamps, said motivating means for said second indicator comprising a switching means and an energy source, said switching means being adapted to energize a predetermined number of adjacent ones of said plurality of indicating lamps symmetrically disposed with respect to said horizontal reference index in response to said speed command signal being zero, said switching means energizing a corresponding number of adjacent ones of said indicating lamps the center one of which is positioned with respect to said horizontal reference index by a distance and in a direction respectively proportional to the magnitude and sense of an input speed command signal other than zero.

4. A flight director instrument as defined in claim 3 wherein said motivating means comprises a plurality of photoelectric sensing devices corresponding in number to said plurality of lamps, a light source arranged to impinge on said photoelectric devices, a meter movement including a deflection winding and a deflection arm member, a light masking member carried on said deflection arm and arranged to be disposed between said light source and said photoelectric devices, said masking member being dimensioned to mask a predetermined number of adjacent ones of said photoelectric devices corresponding to said plurality of adjacent ones of said indicating lamps to be energized, a plurality of switching means one of which is operably connected to each of said photoelectric devices, each of said switching means being responsive to the interruption of light impinging on the associated one of said photoelectric devices to energize the associated one of said indicating lamps, and said input speed command signal being applied to said meter deflection winding.

5. A flight director instrument as defined in claim 4 further comprising means for maintaining energization of the corresponding extreme one of said plurality of indicating lamps in response to speed command input signals of either sense with a magnitude in excess of that magnitude corresponding to a full scale indication of said second indicating means.

6. A flight director instrument as defined in claim 5 wherein said means for maintaining energization of the extreme ones of said indicating lamps comprises means limiting the deflection extremes of said meter deflection arm to a predetermined maximum deflection at which said light masking means remains positioned between said light source and the end of an external one of said plurality of lamps in said light bank.

7. A flight director instrument as defined in claim 6 including a vertically positionable mounting means for said instrument housing, a first servo positioning means connected to and positioning said mounting means in response to a further input command signal corresponding to a desired flight path to be flown.

8. A flight director instrument as defined in claim 7 wherein said instrument housing is additionally pivotably mounted with respect to said aircraft to permit rotation of said housing in a plane transverse the longitudinal axis of said aircraft, and a further servo positioning means responsive to bank attitude of said aircraft effecting a bank stabilization of said instrument.

9. A flight director instrument as defined in claim 8 including means operable with said first servo positioning means to position the instrument of said housing at a predetermined reference vertical position with respect to the longitudinal axis of said aircraft, said predetermined vertical positioning means comprises a reference position about which said instrument housing is positioned vertically in response to input command signals being appied to said servo positioning means.

10. A flight director instrument as defined in claim 9 further comprising a third indicating means comprising a bar extending transverse of and within the confines of said vewing window and means for displacing said bar along the vertical axis of said instrument with respect to and beneath said horizontal reference line by a distance proportional to aircraft altitude.

11. A flight director instrument as defined in claim 10 wherein said horizontal reference bar extends beyond the transverse extremes of said instrument housing.

12. A flight director instrument as defined in claim 1 including a vertically positionable mounting means for said instrument housing, a first servo positioning means connected to and positioning said mounting means in response to a further input command signal corresponding to a desired flight path to be flown.

13. A flight director instrument as defined in claim 12 wherein said instrument housing is additionally pivotably mounted with respect to said aircraft to permit rotation of said housing in a plane transverse the longitudinal axis of said aircraft, and a further servo positioning means responsive to bank attitude of said aircraft effecting a bank stabilization of said instrument.

14. A flight director instrument as defined in claim 13 including means operable with said first servo positioning means to position the instrument of said housing at a predetermined reference vertical position with respect to the longitudinal axis of said aircraft, said predetermined vertical positioning means comprises a reference position about which said instrument housing is positioned vertically in response to input command signals being applied to said first servo positioning means.

15. A flight director instrument as defined in claim 14 further comprising a third indicating means compirsing a bar extending transverse of and within the confines of said viewing window, and means for displacing said bar along the vertical axis of said instrument with respect to and beneath said horizontal reference line by a distance proportional to aircraft altitude.

16. A flight director instrument as defined in claim 15 wherein said horizontal reference bar extends beyond the transverse extremes of said instrument housing.

17. In an aircraft flight director indicator of the type comprising an indicator including a reference index member and an indicator positionable with reference to said index member, said indicator comprising a vertically extending bank of adjacently mounted indicating lamps, motivating means for said indicator comprising a switching means and an energy source, said switching means being adapted to energize a predetermined number of adjacent ones of said plurality of indicating lamps symmetrically disposed with respect to said reference index in response to input speed command signal being zero, said switching means energizing a corresponding number of adjacent ones of said indicating lamps the center one of which is positioned with respect to said reference index by a distance and in a direction respectively proportional to the magnitude and sense of an input speed command signal other than zero; said motivating means comprising, a plurality of photoelectric sensing devices corresponding in number to said plurality of lamps, a light source arranged to impinge on said photoelectric device, a meter movement including a deflection winding and a deflection arm member, a light masking member carried on said deflection arm and arranged to be disposed between said light source and said photoelectric devices, said masking member being dimensioned to mask a predetermined number of adjacent ones of said photoelectric devices corresponding to said plurality of adjacent ones of said indicating lamps to be energized, and a plurality of switching means one of which is operably connected to each of said photoelectric devices, each said switching means being responsive to the interruption of light impinging on the associated one of said photoelectric devices to energize the associated one of said indicating lamps and said input command signal being applied to said meter deflection winding.

18. Means for energizing a predetermined number of adjacent ones of a plurality of adjacently disposed indicating lamps in response to a direct current input signal varying in magnitude and polarity whereby the relative position of the energized ones of said lamps with reference to said lamp bank is an analogue of said input signal, comprising, a plurality of photoelectric sensing devices corresponding in number to said plurality of lamps, a light source arranged to impinge on said photoelectric devices, a meter movement including a deflection winding and a deflection arm member, a light masking member carried on said deflection arm and arranged to be disposed between said light source and said photoelectric devices, said masking member being dimensioned to mask a predetermined number of adjacent ones of said photoelectric devices corresponding to said plurality of adjacent ones of said indicating lamps to be energized, a plurality of switching means one of which is operably connected to each of said photoelectric devices, each said switching means being responsive to the interruption of light impinging on the associated one of said photoelectric devices to energize the asociated one of said indicating lamps, and said input signal being applied to said meter deflection winding.

19. An aircraft flight director instrument comprising an instrument housing, means for mounting said instrument housing in front of the windscreen of an aircraft directly in front of an observer and within the observer's normal viewing field, a generally rectangular and vertically extending viewing window located in said instrument housing and in line with the observer's viewing field, a horizontal reference line index extending transverse the viewing window of said instrument and extending beyond the transverse exteme of said instrument housing at a point substantially midway between the vertical extremes of said viewing window, first indicating means observable through said viewing window, motivating means for said first indicating means, said first indicating means being displaceable with respect to said horizontal index in a direction and by an extent respectively proportional to the sense and magnitude of a pitch command signal applied to the associated motivating means, a second indicating means comprising a vertically extending indicator of predetermined height mounted adjacent at least one side of said viewing window, motivating means for said second indicating means, said second indicating means being adapted for displacement above and below said horizontal reference index by an amount and in a direction respectively proportional to the magnitude and sense of a third input command signal, said third input command signal comprising a speed command signal proportional in magnitude and sense to the discrepancy between the actual speed of said aircraft and a commanded speed of said aircraft, a vertically positionable mounting means for said instrument housing, and a servo positioning means connected to and positioning said mounting means in response to a further input command signal corresponding to a desired flight path to be flown.

20. An aircraft flght director instrument as defined in claim 19 wherein said instrument housing is additionally pivotably mounted with respect to said aircraft to permit rotation of said housing in a plane transverse the longitudinal axis of said aircraft, and a further servo positioning means responsive to bank attitude of said aircraft effecting a bank stabilization of said instrument.

References Cited
UNITED STATES PATENTS 3,190,585  6/1965  Busch et al. _____ 340—27 XR ALVIN H. WARING, Primary Examiner U.S. Cl. X.R.

73—178; 33—46.5